United States Patent
Chang et al.

(10) Patent No.: US 11,161,458 B2
(45) Date of Patent: Nov. 2, 2021

(54) ELECTRONIC REARVIEW MIRROR

(71) Applicant: ABILITY OPTO-ELECTRONICS TECHNOLOGY CO. LTD., Taichung (TW)

(72) Inventors: Yeong-Ming Chang, Taichung (TW); Yi-Chi Cheng, Taichung (TW); Chien-Hsun Lai, Taichung (TW); Yao-Wei Liu, Taichung (TW)

(73) Assignee: Ability Opto-Electronics Technology Co., Ltd., Taichung (CN)

( * ) Notice: Subject to any disclaimer, the term of this patent is extended or adjusted under 35 U.S.C. 154(b) by 507 days.

(21) Appl. No.: 16/194,726

(22) Filed: Nov. 19, 2018

(65) Prior Publication Data

US 2019/0275945 A1 Sep. 12, 2019

Related U.S. Application Data

(60) Provisional application No. 62/638,980, filed on Mar. 6, 2018.

(51) Int. Cl.
*B60R 1/08* (2006.01)
*B60R 1/12* (2006.01)
*G02F 1/157* (2006.01)

(52) U.S. Cl.
CPC ............... *B60R 1/088* (2013.01); *B60R 1/12* (2013.01); *G02F 1/157* (2013.01);
(Continued)

(58) Field of Classification Search
CPC ... B60R 1/088; B60R 1/12; B60R 2001/1215; B60R 2001/1223; B60R 2001/1253; G02F 1/157

(Continued)

(56) References Cited

U.S. PATENT DOCUMENTS

| | | | | |
|---|---|---|---|---|
| 2005/0270620 | A1* | 12/2005 | Bauer | H05K 1/0306 359/265 |
| 2011/0141381 | A1* | 6/2011 | Minikey, Jr. | B60R 1/12 349/11 |
| 2016/0096980 | A1* | 4/2016 | Wieneke | B32B 37/26 428/355 BL |

FOREIGN PATENT DOCUMENTS

TW    M534698 U    1/2017

OTHER PUBLICATIONS

Notice of Office Action of corresponding TW application, published on Jan. 13, 2020.

* cited by examiner

*Primary Examiner* — Marin Pichler
*Assistant Examiner* — Mitchell T Oestreich
(74) *Attorney, Agent, or Firm* — Wang Law Firm, Inc.

(57) ABSTRACT

An electronic rearview mirror is provided, including a first light-transmissive assembly, a second light-transmissive assembly, an electro-optic medium layer, a display device, and an electrical connector. The first light-transmissive assembly may include a first light-receiving surface and a first light-exit surface. The second light-transmissive assembly may be disposed on the first light-receiving surface and include a second light-receiving surface and a second light-exit surface. The electro-optic medium layer may be disposed in the gap formed between the first light-receiving surface in the first light-transmissive assembly and the second light-exit surface in the second light-transmissive assembly. The third light-transmissive assembly may be adhered onto the second light-receiving surface by an optical adhesive and may include a third light-receiving surface and a third light-exit surface. The display device may include a third light-transmissive assembly and an image-projecting unit.

22 Claims, 6 Drawing Sheets

(52) U.S. Cl.
  CPC ............... *B60R 2001/1215* (2013.01); *B60R 2001/1223* (2013.01); *B60R 2001/1253* (2013.01)

(58) Field of Classification Search
  USPC ........................................................ 359/265
  See application file for complete search history.

ELECTRONIC REARVIEW MIRROR

CROSS-REFERENCE TO RELATED APPLICATION

This application claims priority to and the benefit of, pursuant to 35 U.S.C. § 119, U.S. provisional patent application Ser. No. 62/638,980 filed on Mar. 6, 2018, the disclosure of which is incorporated herein in its entirety by reference.

BACKGROUND OF THE INVENTION

1. Field of the Invention

The present invention relates to an electronic rearview mirror, more particularly to an electronic rearview mirror able to reduce a visual depth so as to decrease visual confusion.

2. Description of the Related Art

Figure 1:
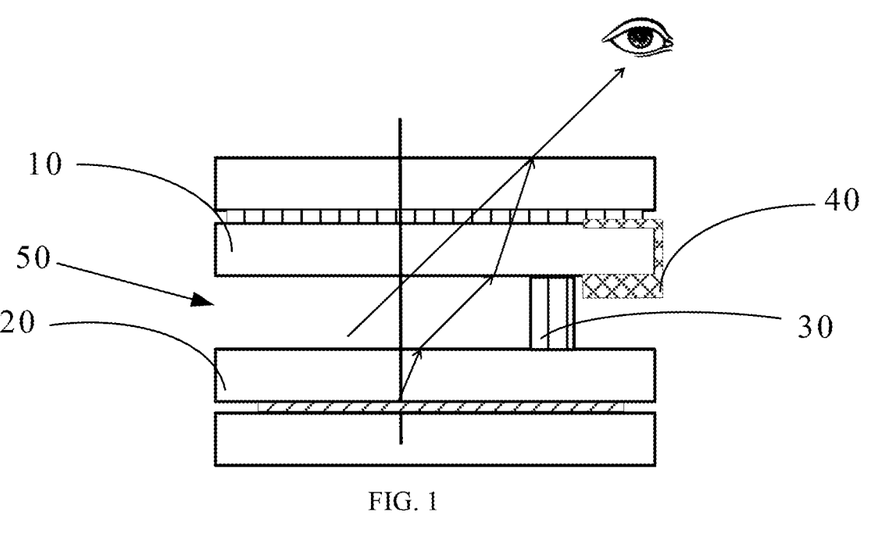
FIG. 1 is a schematic diagram of a conventional electronic rearview mirror.
Figure 2:
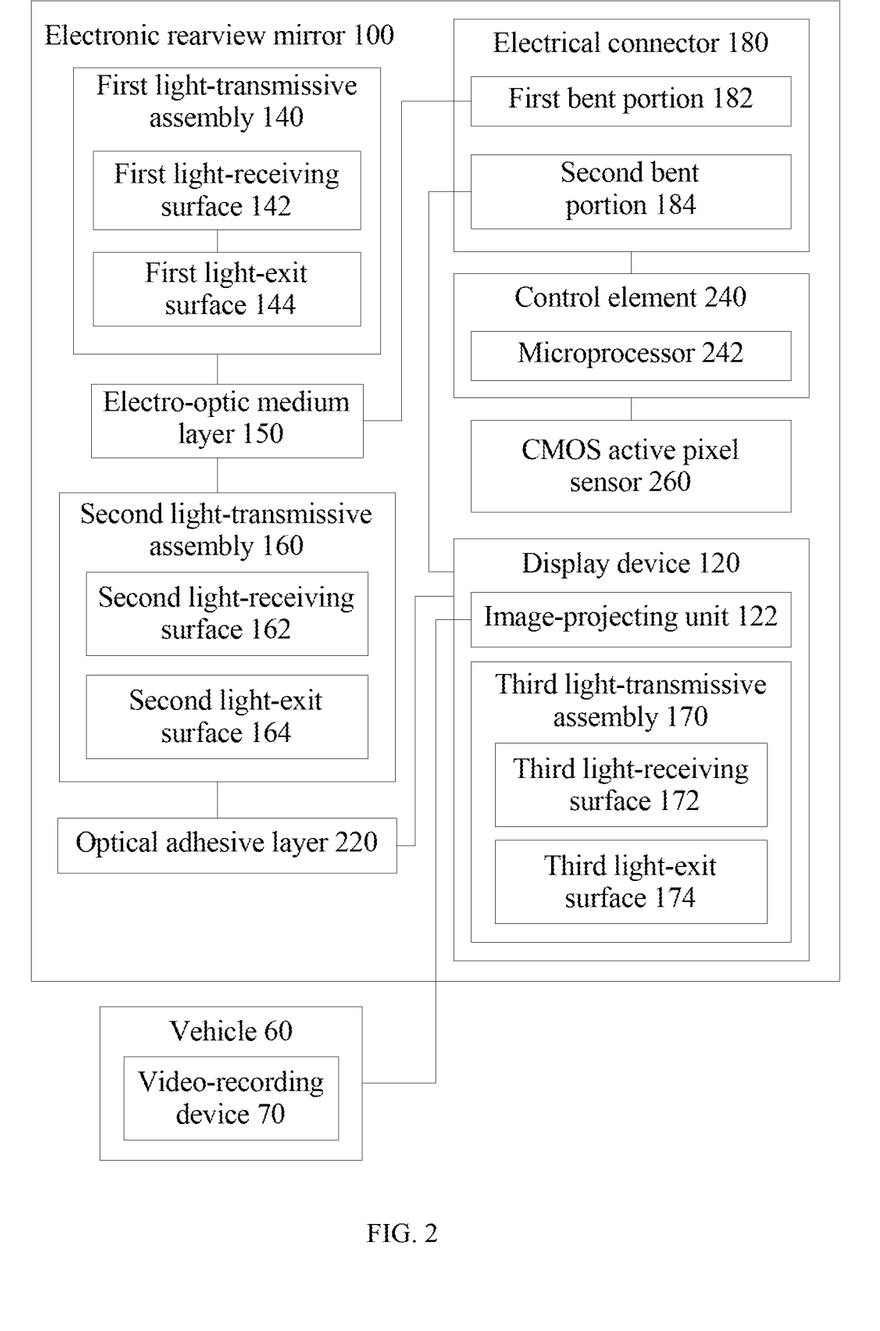
FIG. 2 is a schematic configuration diagram of the electronic rearview mirror according to the embodiment in the present invention.

For a conventional electronic rearview mirror as shown in FIG. 1, an interval assembly 30 has to be disposed between the light-transmissive assembly 10 and the display device 20 to protect the electrode 40. In addition, it is necessary to accommodate other assemblies of the electronic rearview mirror, so a larger gap 50 is required between the light-transmissive assembly 10 and the display device 20. Larger assembly spacing is therefore required, leading to a conventional electronic rearview mirror with a thicker size. In addition, a greater visual depth may also be generated, easily causing visual confusion. Therefore, there is a need for an electronic rearview mirror to solve the problems caused by the conventional electronic rearview mirror.

SUMMARY OF THE INVENTION

In view of the aforementioned problems, the present invention provides an electronic rearview mirror, which attaches a light-transmissive assembly directly with a display device by using an optical adhesive. An electrical connector with bent portions is also disposed to minimize the gaps between assemblies, thus achieving the effect of the visual depth.

On the basis of the purpose as mentioned above, the present invention provides an electronic rearview mirror, including a first light-transmissive assembly, a second light-transmissive assembly, an electro-optic medium layer, an electrical connector, and a display device. The first light-transmissive assembly may include a first light-receiving surface and a first light-exit surface. An image may be emitted into the first light-transmissive assembly from the first light-receiving surface and be emitted from the first light-exit surface. The second light-transmissive assembly may be disposed on the first light-receiving surface, form a gap with the first light-transmissive assembly, and include a second light-receiving surface and a second light-exit surface. An image may be emitted into the second light-transmissive assembly from the second light-receiving surface and be emitted from the second light-exit surface to the first light-receiving surface. The electro-optic medium layer may be disposed in the gap formed between the first light-receiving surface in the first light-transmissive assembly and the second light-exit surface in the second light-transmissive assembly. The display device may include a third light-transmissive assembly and an image-projecting unit. The third light-transmissive assembly may be adhered onto the second light-receiving surface by an optical adhesive which forms an optical adhesive layer and may include a third light-receiving surface and a third light-exit surface. An image may be emitted into the third light-transmissive assembly from the third light-receiving surface and be emitted from the third light-exit surface to the second light-receiving surface. The image-projecting unit may electrically be connected to a video-recording device installed on a vehicle and project the image to the third light-receiving surface. The electrical connector may have a first bent portion and a second bent portion. The first bent portion may be connected to the electro-optic medium layer. The second bent portion may be connected to the display device and transmit an electric energy to the electro-optic medium layer to change a transparency of the electro-optic medium layer. In addition, the refractive indexes of the first light-transmissive assembly, the second light-transmissive assembly, the third light-transmissive assembly, the optical adhesive layer, and the electro-optic medium layer may be expressed as $N1$, $N2$, $N3$, $Nd$, and $Nec$ respectively. The according thicknesses may be expressed as $d1$, $d2$, $d3$, $d4$, and $d5$ respectively. The visual depths may be expressed as $h1$, $h2$, $h3$, $h4$, and $h5$ respectively. A refractive index of an environment where the electronic rearview mirror is located may be expressed as $N$. $N$ is 1. A visual depth $h$ is found by $(d1/N1+d2/N2+d3/N3+d4/Nd+d5/Nec)*N$, where $h$ is less than 3.6 mm.

Preferably, $N1$ is 1.516, $d1$ is less than 3.0 mm, and $h1$ is less than 1.979 mm.

Preferably, $N2$ is 1.516, $d2$ is less than 1.8 mm, and $h2$ is less than 1.187 mm.

Preferably, $N3$ is 1.516, $d3$ is less than 0.2 mm, and $h3$ is less than 0.132 mm.

Preferably, $Nd$ is between 1.47 and 1.63, $d4$ is less than 0.05 mm, and $h4$ is less than 0.033 mm.

Preferably, $Nec$ is between 1.42 and 2.5, $d5$ is less than 0.3 mm, and $h5$ is less than 0.2 mm.

Preferably, the electronic rearview mirror in the present invention further includes a control element connected to the electrical connector. The control element controls the electrical connector to provide the electric energy for the electro-optic medium layer when light exceeding a set brightness is generated on the image.

Preferably, the display device includes one or more of LCDs, LEDs, OLEDs, plasma or digital projecting elements, and liquid crystal display modules.

Preferably, the electrical connector may include one or more of soft circuit boards, copper foils, and electric wires.

On the basis of the aforementioned purpose, the present invention further provides an electronic rearview mirror, including a first light-transmissive assembly, a second light-transmissive assembly, an electro-optic medium layer, an electrical connector, and a display device. The first light-transmissive assembly may include a first light-receiving surface and a first light-exit surface. An image may be emitted into the first light-transmissive assembly from the first light-receiving surface and be emitted from the first light-exit surface. The second light-transmissive assembly may be disposed on the first light-receiving surface, form a gap with the first light-transmissive assembly, and include a second light-receiving surface and a second light-exit surface. An image may be emitted into the second light-transmissive assembly from the second light-receiving surface and be emitted from the second light-exit surface to the first light-receiving surface. The electro-optic medium layer may be disposed in the gap formed between the first light-receiving surface in the first light-transmissive assembly and the second light-exit surface in the second light-transmissive assembly. The display device may include a third light-transmissive assembly and an image-projecting unit. The third light-transmissive assembly may be adhered onto the second light-receiving surface by an optical adhesive which forms an optical adhesive layer and may include a third light-receiving surface and a third light-exit surface. An image may be emitted into the third light-transmissive assembly from the third light-receiving surface and be emitted from the third light-exit surface to the second light-receiving surface. The image-projecting unit may electrically be connected to a video-recording device installed on a vehicle and project the image to the third light-receiving surface. The electrical connector may have a first bent portion and a second bent portion. The first bent portion may be connected to the electro-optic medium layer. The second bent portion may be connected to the display device and transmit an electric energy to the electro-optic medium layer to change a transparency of the electro-optic medium layer. In addition, refractive indexes of the first light-transmissive assembly, the second light-transmissive assembly, the third light-transmissive assembly, the optical adhesive layer, and the electro-optic medium layer may be expressed as N1, N2, N3, Nd, and Nec respectively. The according thicknesses may be expressed as d1, d2, d3, d4, and d5 respectively. The visual depths may be expressed as h1, h2, h3, h4, and h5 respectively. The refractive index of the environment where the electronic rearview mirror is located may be expressed as N. N is 1. The visual depth h may be found by $(d1/N1+d2/N2+d3/N3+d4/Nd+d5/Nec)*N$, where h is less than or equal to 2.0 mm.

Preferably, the thickness of the optical adhesive layer formed by the optical adhesive is less than 0.05 mm.

Preferably, N1, N2, N3, and Nd are 1.516, 1.516, 1.516, and 1.5 respectively. d1, d2, d3, and d4 are 1 mm, 1 mm, 1 mm, and 0.03 mm respectively. h1, h2, h3, and h4 are 0.666 mm, 0.666 mm, 0.660 mm, and 0.020 mm respectively.

Preferably, the optical adhesive layer includes acrylics, the optical adhesive layer has a light transmittance, and the light transmittance is larger than 90%.

Preferably, the electrical connector includes one or more of soft circuit boards, copper foils, and electric wires.

Preferably, the electronic rearview mirror in the present invention further includes a control element connected to the electrical connector. The control element controls the electrical connector to provide the electric energy for the electro-optic medium layer when light exceeding a set brightness is generated on the image.

Preferably, the control element includes a microprocessor.

Preferably, the electronic rearview mirror in the present invention further includes a CMOS active pixel sensor electrically connected to the control element and senses an environmental brightness in the vehicle. The control element controls a brightness of the image projected by the image-projecting unit according to the environmental brightness.

Preferably, the brightness of the image decreases when the environmental brightness decreases. The brightness of the image increases when the environmental brightness increases.

Preferably, the display device includes one or more of LCDs, LEDs, OLEDs, plasma or digital projecting elements, and liquid crystal display modules.

On the basis of the aforementioned purpose, the present invention further provides an electronic rearview mirror, including a first light-transmissive assembly, a second light-transmissive assembly, an electro-optic medium layer, an electrical connector, and a display device. The first light-transmissive assembly may include a first light-receiving surface and a first light-exit surface. An image may be emitted into the first light-transmissive assembly from the first light-receiving surface and be emitted from the first light-exit surface. The second light-transmissive assembly may be disposed on the first light-receiving surface, form a gap with the first light-transmissive assembly, and include a second light-receiving surface and a second light-exit surface. An image may be emitted into the second light-transmissive assembly from the second light-receiving surface and be emitted from the second light-exit surface to the first light-receiving surface. The electro-optic medium layer may be disposed in the gap formed between the first light-receiving surface in the first light-transmissive assembly and the second light-exit surface in the second light-transmissive assembly. The display device may include a third light-transmissive assembly and an image-projecting unit. The third light-transmissive assembly may be adhered onto the second light-receiving surface by an optical adhesive which forms an optical adhesive layer and may include a third light-receiving surface and a third light-exit surface. An image may be emitted into the third light-transmissive assembly from the third light-receiving surface and be emitted from the third light-exit surface to the second light-receiving surface. The image-projecting unit may electrically be connected to a video-recording device installed on a vehicle and project the image to the third light-receiving surface. The electrical connector may have a first bent portion and a second bent portion. The first bent portion may be connected to the electro-optic medium layer. The second bent portion may be connected to the display device and transmit an electric energy to the electro-optic medium layer to change a transparency of the electro-optic medium layer. In addition, refractive indexes of the first light-transmissive assembly, the second light-transmissive assembly, the third light-transmissive assembly, the optical adhesive layer, and the electro-optic medium layer may be expressed as N1, N2, N3, Nd, and Nec respectively. The according thicknesses may be expressed as d1, d2, d3, d4, and d5 respectively. The visual depths may be expressed as h1, h2, h3, h4, and h5 respectively. The refractive index of the environment where the electronic rearview mirror is located may be expressed as N. N is 1. The visual depth h may be found by $(d1/N1+d2/N2+d3/N3+d4/N4+d5/N5)*N$, where h is between 1.6 mm and 4.1 mm.

Preferably, the image projected by the image-projecting unit is parallel to a plane normal vector of the third light-receiving surface.

Preferably, the display device further includes a light guide element. The included angle between the image projected by the image-projecting unit and a plane normal vector of the third light-receiving surface is 90°. The light guide element reflects the image by 90° to make the image parallel to the plane normal vector of the third light-receiving surface.

Preferably, the electronic rearview mirror in the present invention further includes a control element connected to the electrical connector. The control element controls the electrical connector to provide the electric energy for the electro-optic medium layer when light exceeding a set brightness is generated on the image.

Preferably, the electronic rearview mirror in the present invention further includes a CMOS active pixel sensor electrically connected to the control element and senses the environmental brightness inside the vehicle. The control element controls the brightness of the image projected by the image-projecting unit according to the environmental brightness.

Preferably, the display device includes one or more of LCDs, LEDs, OLEDs, plasma or digital projecting elements, and liquid crystal display modules.

DESCRIPTION OF THE PREFERRED EMBODIMENTS

To facilitate the review of the technique characteristics, contents, advantages, and achievable effects of the present invention, the embodiments together with the figures are described in detail as follows. However, the figures are used only for the purpose of indicating and supporting the specification, which is not necessarily the real proportion and precise configuration after the implementation of the present invention. Therefore, the relations of the proportion and configuration of the attached figures should not be interpreted to limit the actual scope of implementation of the present invention.

The embodiments of the electronic rearview mirror in the present invention are explained with reference to the related figures. For ease of understanding, the same elements in the following embodiments are explained in accordance with the same symbols.

Please refer to FIGS. 3 to 6, respectively illustrating the schematic configuration diagram, the first schematic diagram, the second schematic diagram, the visual-depth schematic diagram, and the first schematic implementation diagram of the electronic rearview mirror according to the embodiment in the present invention. The electronic rearview mirror 100 in the present invention may include a first light-transmissive assembly 140, a second light-transmissive assembly 160, a display device 120, and an electrical connector 180. In an embodiment, the first light-transmissive assembly 140, the second light-transmissive assembly 160, and the display device 120 may all include glass.

The first light-transmissive assembly 140 may further include a first light-receiving surface 142 and a first light-exit surface 144. The image projected by the image projecting unit 122 of the display device 120 may be emitted after entering the second light-transmissive assembly 160. The image then may be emitted into the first light-transmissive assembly 140 from the first light-receiving surface 142 and be emitted from the first light-exit surface 144 for the user to view.

The second light-transmissive assembly 160 may be disposed on the first light-receiving surface 142, forming a gap with the first light-transmissive assembly 140, and include a second light-receiving surface 162 and a second light-exit surface 164. The image projected by the image projecting unit 122 may be emitted into the second light-transmissive assembly 160 from the second light-receiving surface 162 and be emitted from the second light-exit surface 164 to the first light-receiving surface 142.

An electro-optic medium layer 150 may be disposed in the gap formed between the first light-receiving surface 142 in the first light-transmissive assembly 140 and the second light-exit surface 164 in the second light-transmissive assembly 160. The display device 120 may include the third light-transmissive assembly 170, the image-projecting unit 122 and a back substrate 190. The third light-transmissive assembly 170 may be adhered onto the second light-receiving surface 162 by an optical adhesive. The optical adhesive may form an optical adhesive layer 220. The third light-transmissive assembly 170 may include the third light-receiving surface 172 and the third light-exit surface 174. An image may be emitted into the third light-transmissive assembly 170 from the third light-receiving surface 172 and be emitted from the third light-exit surface 174 to the second light-receiving surface 162.

In an embodiment, the thickness of the optical adhesive layer 220 formed by the optical adhesive is less than 0.05 mm or preferably 0.03 mm. To maintain the quality of the image, the optical adhesive layer 220 may include acrylics. The optical adhesive layer 220 has a light transmittance larger than 90% after entering the second light-transmissive assembly 160 to ensure the quality of image, such as colors, brightness, etc.

The image-projecting unit 122 may electrically be connected to a video-recording device 200 installed on a vehicle and project the image to the third light-receiving surface 172. In an embodiment, the image-projecting unit 122 may include a light-emitting unit with at least red, green, and blue colors to project the image.

Figure 7:
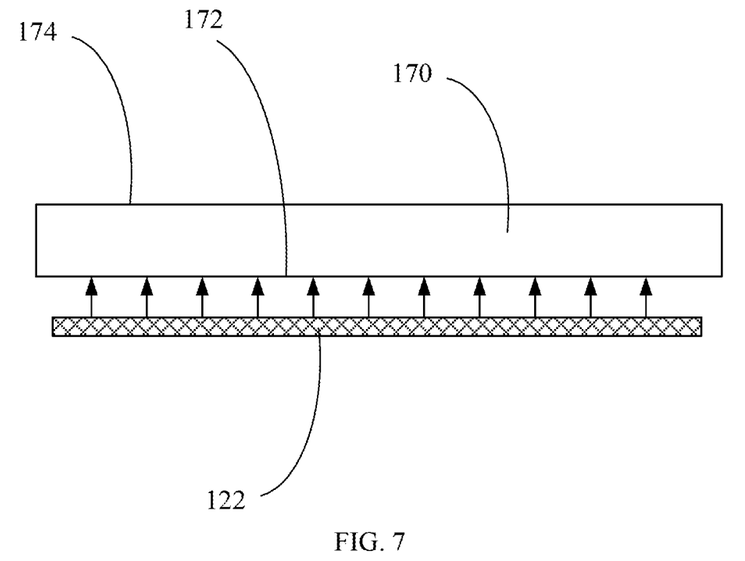
FIG. 7 is a second schematic implementation diagram of the electronic rearview mirror according to the embodiment in the present invention.

In an embodiment, as shown in FIG. 7, the display device 120 may further include one or more of LCDs, LEDs, OLEDs, plasma or digital projecting elements, and liquid crystal display modules (LCM). In addition, the image projected by the image-projecting unit 122 is parallel to a plane normal vector of the third light-receiving surface 172. Therefore, the display device 120 may be a rear-projection display device 120.

Figure 8:
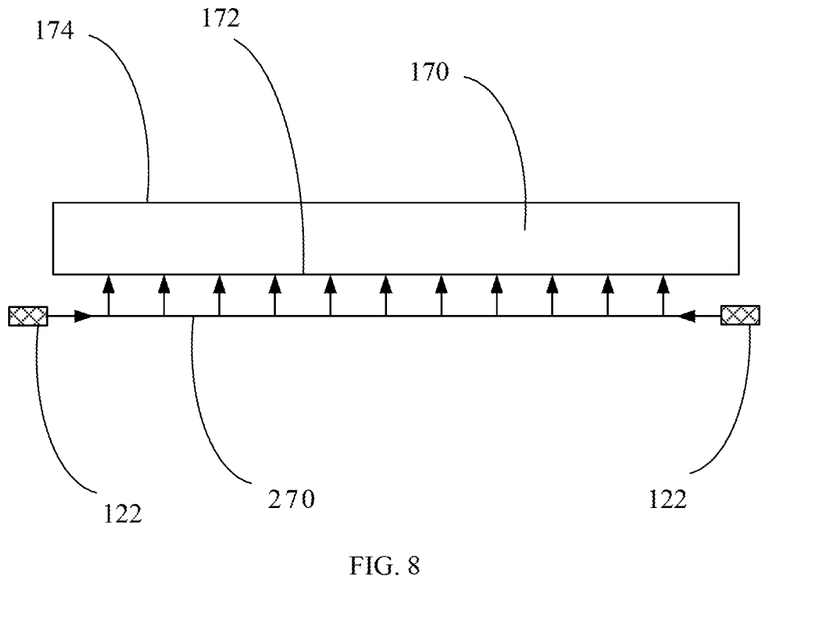
FIG. 8 is a third schematic implementation diagram of the electronic rearview mirror according to the embodiment in the present invention.

In another embodiment, as shown in FIG. 8, the display device 120 may further include a light guide element 270. The included angle between the image projected by the image-projecting unit 122 and a plane normal vector of the third light-receiving surface 172 is 90°. The light guide element 270 reflects the image by 90° to make the image parallel to the plane normal vector of the third light-receiving surface 172. Therefore, the display device 120 can be a side-projection display device 120.

Figure 5:
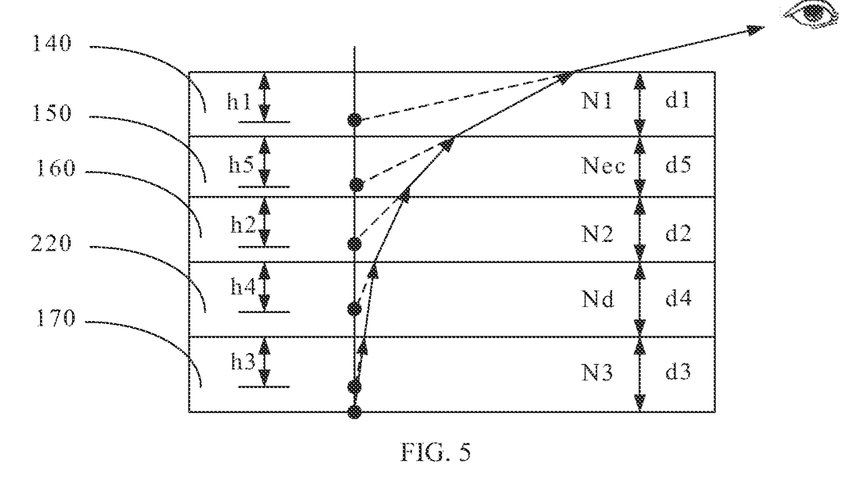
FIG. 5 is a visual-depth schematic diagram of the electronic rearview mirror according to the embodiment in the present invention.

Specifically, the refractive indexes of the first light-transmissive assembly 140, the second light-transmissive assembly 160, the third light-transmissive assembly 170, the optical adhesive layer 220, and the electro-optic medium layer 150 may be expressed as N1, N2, N3, Nd, and Nec respectively. The according thicknesses may be expressed as d1, d2, d3, d4, and d5 respectively. The visual depths may be expressed as h1, h2, h3, h4, and h5 respectively. The refractive index of the environment where the electronic rearview mirror 100 is located may be expressed as N. N is 1. The visual depth h may be found by (d1/N1+d2/N2+d3/N3+d4/Nd+d5/Nec)*N, where h is less than 3.6 mm.

In an embodiment, N1 is 1.516, d1 is less than 3 mm, and h1 is less than 1.979 mm. In an embodiment, N2 is 1.516, d2 is less than 1.8 mm, and h2 is less than 1.187 mm. In an embodiment, N3 is 1.516, d3 is less than 0.2 mm, and h3 is less than 0.132 mm. In an embodiment, Nd is between 1.47 and 1.63, d4 is less than 0.05 mm, and d4 is less than 0.033 mm. In an embodiment, Nec is between 1.42 and 2.5, d5 is less than 0.3 mm, and h5 is less than 0.2 mm.

For instance, d1 may be 0.20 mm, d2 may be 1.80 mm, d3 may be 1.10 mm, and d5 may be 0.03 mm. Thus, under the condition that the electro-optic medium layer 150 is not considered, the visual depth h is less than 3.6 mm. With the consideration of the electro-optic medium layer 150, the thicknesses from d1 to d5 may be adjusted. For instance, the thicknesses from d1 to d5 may respectively be 3 mm, 1.8 mm, 0.2 mm, 0.3 mm, and 0.05 mm. Therefore, the visual depths from h1 to h5 may respectively be 1.979 mm, 1.187 mm, 0.132 mm, 0.2 mm, and 0.033 mm, making the visual depth h less than 3.6 mm.

In another embodiment, the visual depth h may be 2.006 mm, thus making the electronic rearview mirror 100 in the present invention thinner. For instance, N1, N2, N3, Nec, and Nd are 1.516, 1.516, 1.516, 1.5, and 1.5 respectively; d1, d2, d3, d4, and d5 are 1 mm, 1 mm, 1 mm, 0.3 mm, and 0.03 mm respectively; and h1, h2, h3, h4, and h5 are 0.666 mm, 0.666 mm, 0.660 mm, 0.2 mm, and 0.020 mm respectively.

In another embodiment, the visual depth h may be 1.671 mm, thus making the electronic rearview mirror 100 in the present invention even thinner. For instance, N1, N2, N3, Nec, and Nd are 1.516, 1.516, 1.516, 1.5, and 1.5 respectively; d1, d2, d3, d4, and d5 are 1 mm, 1 mm, 0.2 mm, 0.3 mm, and 0.03 mm respectively; and h1, h2, h3, h4, and h5 are 0.666 mm, 0.666 mm, 0.132 mm, 0.2 mm, and 0.020 mm respectively.

In another embodiment, the visual depth h may be between 1.6 mm and 4.1 mm. For instance, N1, N2, N3, Nd, and Nec are 1.516, 1.516, 1.516, 1.5, and 1.5 respectively; d1, d2, d3, d4, and d5 are 3 mm, 1.8 mm, 0.2 mm, 0.03 mm, and 0.3 mm respectively; and h1, h2, h3, h4, and h5 are 1.979 mm, 1.187 mm, 0.132 mm, 0.020 mm, and 0.2 mm respectively. Therefore, h may be 3.518 mm.

Therefore, the electronic rearview mirror 100 in the present invention may have a shallower visual depth, which may prevent the user from misjudging an object behind, namely an incoming car in a distance, thus improving visual depth and decreasing visual confusion.

Figure 3:
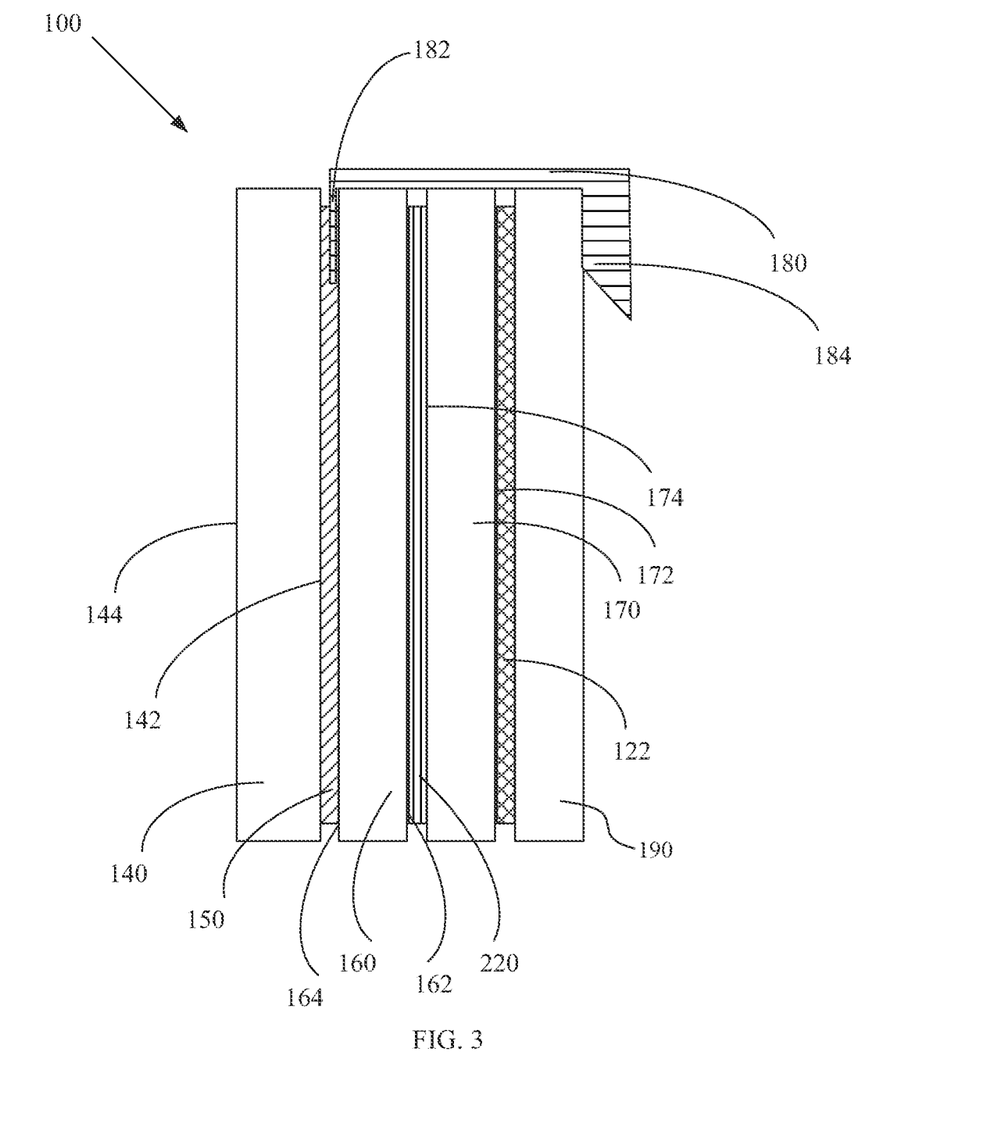
FIG. 3 is a first schematic diagram of the electronic rearview mirror according to the embodiment in the present invention.
Figure 4:
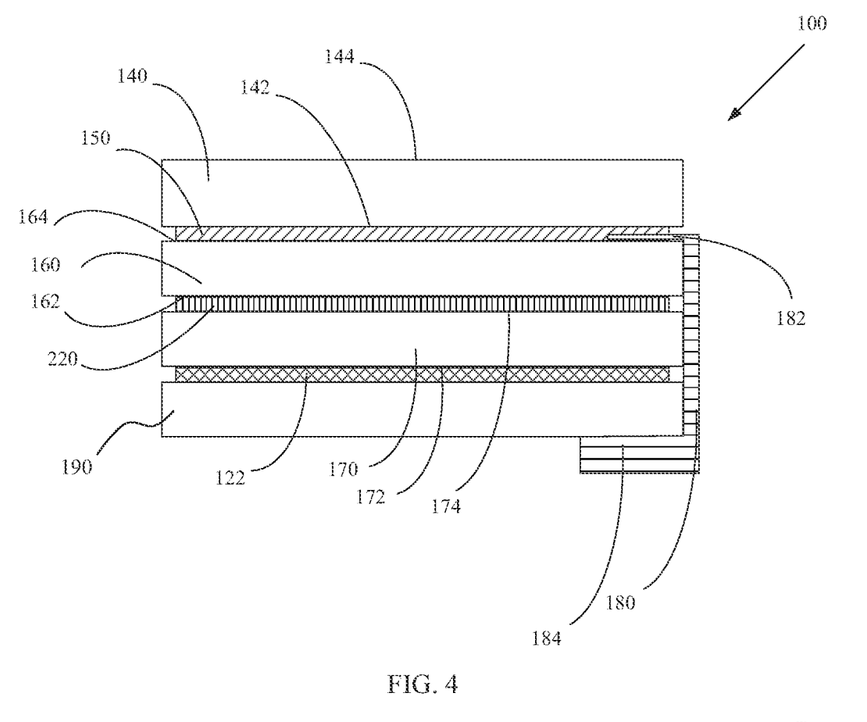
FIG. 4 is a second schematic diagram of the electronic rearview mirror according to the embodiment in the present invention.

The electrical connector 180 may have a first bent portion 182 and a second bent portion 184. The first bent portion 182 may be connected to the electro-optic medium layer 150. The second bent portion 184 may be connected to the display device 120 and transmit an electric energy to the electro-optic medium layer 150 to change a transparency of the electro-optic medium layer 150, thus achieving the effect of anti-glare or being able to make adjustment on the brightness of the image emitted into the first light-transmissive assembly 140.

Specifically, the electrical connector 180 may have the first bent portion 182 and the second bent portion 184. Moreover, in an embodiment, the electrical connector 180 may have one or more of soft circuit boards, copper foils, and electric wires. Therefore, the electrical connector 180 may be bent to generate the first bent portion 182 and the second bent portion 184.

In an embodiment, the electrical connector 180 may be in a U shape, thereby minimizing the gap between the display device 120 and the second light-transmissive assembly 160 and making the display device 120 and the second light-transmissive assembly 160 able to be attached together by an optical adhesive to form a compact configuration. The overall thickness of the electronic rearview mirror 100 may therefore be minimized. Because of a more compact configuration, the whole entity of the electronic rearview mirror 100 may have a lighter weight, a better anti-impact structural intensity, and an improved anti-deformation intensity.

Figure 6:
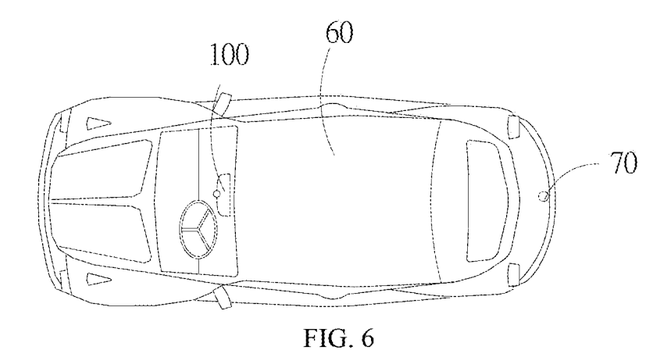
FIG. 6 is a first schematic implementation diagram of the electronic rearview mirror according to the embodiment in the present invention.

In addition, in an embodiment, electronic rearview mirror 100 in the present invention may further include a control element 240 connected to the electrical connector 180. The control element 240 controls the electrical connector 180 to provide the electric energy for the electro-optic medium layer 150 when light exceeding a set brightness is generated on the image, in such a case that the high beam lights of an incoming car are switched on or the head lights are too bright. The glare may therefore be prevented.

In addition, in an embodiment, the control element 240 may include a processor 242 and a CMOS active pixel sensor 260. The CMOS active pixel sensor 260 may electrically be connected to the control element 240, for instance, using the processor 242 in the control element 240 to sense the environmental brightness in the vehicle. The control element 240 controls a brightness of the image projected by the image-projecting unit according to the environmental brightness. Therefore, in an embodiment, when the environmental brightness decreases, in such a case of a car entering a tunnel, the brightness of the image may decrease. In contrast, when the environmental brightness increases, in such a case of a car exiting from a tunnel, the brightness of the image may increase.

Therefore, in the present invention, the second light-transmissive assembly 160 may directly be attached to the display device 120 by an optical adhesive. The first bent portion 182 of the electrical connector 180 may be connected to the electro-optic medium layer 150. The second bent portion 184 may be connected to the display device 120 to minimize the visual depth and the thickness of the electronic rearview mirror 100.

What is stated above is only illustrative examples which do not limit the present invention. Any spirit and scope without departing from the present invention as to equivalent modifications or alterations is intended to be included in the following claims.

What is claimed is:

1. An electronic rearview mirror, comprising:
   a first light-transmissive assembly, comprising:
   a first light-receiving surface; and
   a first light-exit surface, wherein an image is emitted into the first light-transmissive assembly from the first light-receiving surface and is emitted from the first light-exit surface;
   a second light-transmissive assembly, disposed on the first light-receiving surface, forming a gap with the first light-transmissive assembly, and comprising:
   a second light-receiving surface; and
   a second light-exit surface, wherein the image is emitted into the second light-transmissive assembly from the second light-receiving surface and is emitted from the second light-exit surface to the first light-receiving surface;

an electro-optic medium layer, disposed in the gap formed between the first light-receiving surface in the first light-transmissive assembly and the second light-exit surface in the second light-transmissive assembly;
a display device, comprising:
a third light-transmissive assembly, adhered onto the second light-receiving surface by an optical adhesive, the optical adhesive forming an optical adhesive layer, and the third light-transmissive assembly comprising:
a third light-receiving surface; and
a third light-exit surface, wherein the image is emitted into the third light-transmissive assembly from the third light-receiving surface and is emitted from the third light-exit surface to the second light-receiving surface; and
an image-projecting unit, electrically connected to a video-recording device installed on a vehicle and projecting the image to the third light-receiving surface; and
an electrical connector, having a first bent portion and a second bent portion, the first bent portion connected to the electro-optic medium layer, the second bent portion connected to the display device, and transmitting an electric energy to the electro-optic medium layer to change a transparency of the electro-optic medium layer; and
wherein, refractive indexes of the first light-transmissive assembly, the second light-transmissive assembly, the third light-transmissive assembly, the optical adhesive layer, and the electro-optic medium layer are expressed as N1, N2, N3, Nd, and Nec respectively, thicknesses are d1, d2, d3, d4, and d5 respectively, visual depths are expressed as h1, h2, h3, h4, and h5 respectively, a refractive index of an environment where the electronic rearview mirror is located is expressed as N, N is 1, the visual depth h is found by (d1/N1+d2/N2+d3/N3+d4/Nd+d5/Nec)*N, where h is less than 3.6 mm;
wherein Nd is between 1.47 and 1.63, d4 is less than 0.05 mm, and h4 is less than 0.033 mm.

2. The electronic rearview mirror according to claim 1, wherein N1 is 1.516, d1 is less than 3 mm, and h1 is less than 1.979 mm.

3. The electronic rearview mirror according to claim 1, wherein N2 is 1.516, d2 is less than 1.8 mm, and h2 is less than 1.187 mm.

4. The electronic rearview mirror according to claim 1, wherein N3 is 1.516, d3 is less than 0.2 mm, and h3 is less than 0.132 mm.

5. The electronic rearview mirror according to claim 1, wherein Nec is between 1.42 and 2.5, d5 is less than 0.3 mm, and h5 is less than 0.2 mm.

6. The electronic rearview mirror according to claim 1, further comprising a control element connected to the electrical connector, wherein the control element controls the electrical connector to provide the electric energy for the electro-optic medium layer when light exceeding a set brightness is generated on the image.

7. The electronic rearview mirror according to claim 1, wherein the display device comprises one or more of LCDs, LEDs, OLEDs, plasma or digital projecting elements, and liquid crystal display modules.

8. The electronic rearview mirror according to claim 1, wherein the electrical connector comprises one or more of soft circuit boards, copper foils, and electric wires.

9. An electronic rearview mirror, comprising:
a first light-transmissive assembly, comprising:
a first light-receiving surface; and
a first light-exit surface, wherein an image is emitted into the first light-transmissive assembly from the first light-receiving surface and is emitted from the first light-exit surface;
a second light-transmissive assembly, disposed on the first light-receiving surface, forming a gap with the first light-transmissive assembly, and comprising:
a second light-receiving surface; and
a second light-exit surface, wherein the image is emitted into the second light-transmissive assembly from the second light-receiving surface and is emitted from the second light-exit surface to the first light-receiving surface;
an electro-optic medium layer, disposed in the gap formed between the first light-receiving surface in the first light-transmissive assembly and the second light-exit surface in the second light-transmissive assembly;
a display device, comprising:
a third light-transmissive assembly, adhered onto the second light-receiving surface by an optical adhesive, the optical adhesive forming an optical adhesive layer, and the third light-transmissive assembly comprising:
a third light-receiving surface; and
a third light-exit surface, wherein the image is emitted into the third light-transmissive assembly from the third light-receiving surface and is emitted from the third light-exit surface to the second light-receiving surface; and
an image-projecting unit, electrically connected to a video-recording device installed on a vehicle and projecting the image to the third light-receiving surface; and
an electrical connector, having a first bent portion and a second bent portion, the first bent portion connected to the electro-optic medium layer, the second bent portion connected to the display device, and transmitting an electric energy to the electro-optic medium layer to change a transparency of the electro-optic medium layer; and
wherein, refractive indexes of the first light-transmissive assembly, the second light-transmissive assembly, the third light-transmissive assembly, the optical adhesive layer, and the electro-optic medium layer are expressed as N1, N2, N3, Nd, and Nec respectively, thicknesses are d1, d2, d3, d4, and d5 respectively, visual depths are expressed as h1, h2, h3, h4, and h5 respectively, a refractive index of an environment where the electronic rearview mirror is located is expressed as N, N is 1, an visual depth h is found by (d1/N1+d2/N2+d3/N3+d4/Nd+d5/Nec)*N, where h is less than or equal to 2.0 mm;
wherein N1, N2, N3, and Nd are 1.516, 1.516, 1.516, and 1.5 respectively; d1, d2, d3, and d4 are 1 mm, 1 mm, 1 mm, and 0.03 mm respectively; and h1, h2, h3, and h4 are 0.666 mm, 0.666 mm, 0.660 mm, and 0.020 mm respectively.

10. The electronic rearview mirror according to claim 9, wherein the optical adhesive layer comprises acrylics, the optical adhesive layer has a light transmittance, and the light transmittance is larger than 90%.

11. The electronic rearview mirror according to claim 9, wherein the electrical connector comprises one or more of flexible circuit boards, copper foils, and electric wires.

12. The electronic rearview mirror according to claim 9, further comprising a control element connected to the electrical connector, wherein the control element controls the electrical connector to provide the electric energy for the electro-optic medium layer when light exceeding a set brightness is generated on the image.

13. The electronic rearview mirror according to claim 12, wherein the control element comprises a microprocessor.

14. The electronic rearview mirror according to claim 12, further comprising a CMOS active pixel sensor electrically connected to the control element and sensing an environmental brightness in the vehicle, wherein the control element controls a brightness of the image projected by the image-projecting unit according to the environmental brightness.

15. The electronic rearview mirror according to claim 14, wherein the brightness of the image decreases when the environmental brightness decreases, and the brightness of the image increases when the environmental brightness increases.

16. The electronic rearview mirror according to claim 9, wherein the display device comprises one or more of LCDs, LEDs, OLEDs, plasma or digital projecting elements, and liquid crystal display modules.

17. An electronic rearview mirror, comprising:
a first light-transmissive assembly, comprising:
a first light-receiving surface; and
a first light-exit surface, wherein an image is emitted into the first light-transmissive assembly from the first light-receiving surface and is emitted from the first light-exit surface;
a second light-transmissive assembly, disposed on the first light-receiving surface, forming a gap with the first light-transmissive assembly, and comprising:
a second light-receiving surface; and
a second light-exit surface, wherein the image is emitted into the second light-transmissive assembly from the second light-receiving surface and is emitted from the second light-exit surface to the first light-receiving surface;
an electro-optic medium layer, disposed in the gap formed between the first light-receiving surface in the first light-transmissive assembly and the second light-exit surface in the second light-transmissive assembly;
a display device, comprising:
a third light-transmissive assembly, adhered onto the second light-receiving surface by an optical adhesive, the optical adhesive forming an optical adhesive layer, and the third light-transmissive assembly comprising:
a third light-receiving surface; and
a third light-exit surface, wherein the image is emitted into the third light-transmissive assembly from the third light-receiving surface and is emitted from the third light-exit surface to the second light-receiving surface; and an image-projecting unit, electrically connected to a video-recording device installed on a vehicle and projecting the image to the third light-receiving surface; and an electrical connector, having a first bent portion and a second bent portion, the first bent portion connected to the electro-optic medium layer, the second bent portion connected to the display device, and transmitting an electric energy to the electro-optic medium layer to change a transparency of the electro-optic medium layer; and wherein, refractive indexes of the first light-transmissive assembly, the second light-transmissive assembly, the third light-transmissive assembly, the optical adhesive layer, and the electro-optic medium layer are expressed as N1, N2, N3, Nd, and Nec respectively, thicknesses are expressed as d1, d2, d3, d4, and d5 respectively, visual depths are expressed as h1, h2, h3, h4, and h5 respectively, a refractive index of an environment where the electronic rearview mirror is located is expressed as N, N is 1, an visual depth h is found by (d1/N1+d2/N2+d3/N3+d4/Nd+d5/Nec)*N, where his between 1.6 mm and 4.1 mm;

wherein Nd is between 1.47 and 1.63, d4 is less than 0.05 mm, and h4 is less than 0.033 mm.

18. The electronic rearview mirror according to claim 17, wherein the image projected by the image-projecting unit is parallel to a plane normal vector of the third light-receiving surface.

19. The electronic rearview mirror according to claim 17, wherein the display device further comprises a light guide element, an included angle between the image projected by the image-projecting unit and a plane normal vector of the third light-receiving surface is 90°, and the light guide element reflects the image by 90° to make the image parallel to the plane normal vector of the third light-receiving surface.

20. The electronic rearview mirror according to claim 17, further comprising a control element connected to the electrical connector, wherein the control element controls the electrical connector to provide the electric energy for the electro-optic medium layer when light exceeding a set brightness is generated on the image.

21. The electronic rearview mirror according to claim 20, further comprising a CMOS active pixel sensor electrically connected to the control element and sensing an environmental brightness in the vehicle, wherein the control element controls a brightness of the image projected by the image-projecting unit according to the environmental brightness.

22. The electronic rearview mirror according to claim 17, wherein the display device comprises one or more of LCDs, LEDs, OLEDs, plasma or digital projecting elements, and liquid crystal display modules.

* * * * *